(12) United States Patent
Testi

(10) Patent No.: US 10,673,239 B2
(45) Date of Patent: Jun. 2, 2020

(54) MICRO-GRID HAVING A DIESEL GENERATOR WITH CLUTCH

(71) Applicant: ABB Schweiz AG, Baden (CH)

(72) Inventor: Giandomenico Testi, Milan (IT)

(73) Assignee: ABB Power Grids Switzerland AG, Baden (CH)

( * ) Notice: Subject to any disclaimer, the term of this patent is extended or adjusted under 35 U.S.C. 154(b) by 109 days.

(21) Appl. No.: 15/761,001

(22) PCT Filed: Sep. 16, 2016

(86) PCT No.: PCT/IB2016/055518
§ 371 (c)(1),
(2) Date: Mar. 16, 2018

(87) PCT Pub. No.: WO2017/046748
PCT Pub. Date: Mar. 23, 2017

(65) Prior Publication Data
US 2018/0262007 A1    Sep. 13, 2018

(30) Foreign Application Priority Data

Sep. 18, 2015    (IN) ............................ 5007/CHE/2015

(51) Int. Cl.
*H02J 3/30* (2006.01)
*H02J 3/38* (2006.01)
(Continued)

(52) U.S. Cl.
CPC .................................... *H02J 3/30* (2013.01); *H02J 1/16* (2013.01); *H02J 3/382* (2013.01); *H02J 3/383* (2013.01);
(Continued)

(58) Field of Classification Search
CPC .......... H02J 3/30; H02J 13/0017; H02J 3/382; H02J 3/386; H02J 3/383; H02J 13/0086;
(Continued)

(56) References Cited

U.S. PATENT DOCUMENTS

| 6,417,578 B1* | 7/2002 | Chapman | ................ F01D 15/10 290/44 |
| 2004/0098142 A1 | 5/2004 | Warren et al. | |
| 2008/0189567 A1* | 8/2008 | Goodnow | .............. C09K 11/77 713/340 |
| 2011/0034297 A1* | 2/2011 | Jerwick | .................... B60K 6/40 477/5 |

(Continued)

FOREIGN PATENT DOCUMENTS

| EP | 2515406 A1 | 10/2012 |
| GB | 2246602 A | 2/1992 |

OTHER PUBLICATIONS

European Patent Office, International Search Report for PCT/IB2016/055518, dated Nov. 18, 2016, 4 pages.

(Continued)

*Primary Examiner* — Pinping Sun
(74) *Attorney, Agent, or Firm* — Slater Matsil, LLP

(57) ABSTRACT

The present invention discloses a control system for monitoring and control of a micro-grid (100). The control system comprises a first controller for controlling of at least one of a power generation source and an electrical load, and a second controller (245) for controlling a rotating electrical machine (246). The rotating electrical machine (246) is electrically connectable to an electrical bus (205) of the micro-grid (100) for one of receiving electrical power and supplying electrical power. The second controller (245) is configured to coordinate with the first controller for operating the rotating electrical machine (246) by engaging the clutch (244) to couple the rotating electrical machine (246) to the prime mover (242), for supplying power.

9 Claims, 4 Drawing Sheets

(51) Int. Cl.
*H02J 13/00* (2006.01)
*H02P 9/06* (2006.01)
*H02J 1/16* (2006.01)

(52) U.S. Cl.
CPC .......... *H02J 3/386* (2013.01); *H02J 13/0017* (2013.01); *H02J 13/0086* (2013.01); *H02P 9/06* (2013.01); *Y02B 90/222* (2013.01); *Y02E 10/563* (2013.01); *Y02E 10/566* (2013.01); *Y02E 10/763* (2013.01); *Y02E 40/72* (2013.01); *Y02E 60/16* (2013.01); *Y02E 60/722* (2013.01); *Y02E 70/30* (2013.01); *Y04S 10/123* (2013.01); *Y04S 10/14* (2013.01); *Y04S 20/12* (2013.01)

(58) Field of Classification Search
CPC .. H02J 1/16; H02P 9/06; Y02E 60/722; Y02E 70/30; Y02E 60/16; Y02E 40/72; Y02E 10/763; Y02E 10/566; Y02E 10/563; Y04S 10/14; Y04S 20/12; Y04S 10/123; Y02B 90/222
See application file for complete search history.

(56) References Cited

U.S. PATENT DOCUMENTS

| | | | |
|---|---|---|---|
| 2011/0241630 A1* | 10/2011 | Ritchey | H02P 9/02 322/23 |
| 2012/0239215 A1* | 9/2012 | Timbus | H02J 3/38 700/292 |
| 2013/0334887 A1* | 12/2013 | Linden | H02J 1/12 307/82 |
| 2014/0200723 A1* | 7/2014 | Roy | G06Q 50/06 700/291 |
| 2015/0061298 A1* | 3/2015 | Panosyan | H02P 9/04 290/40 B |
| 2017/0250540 A1* | 8/2017 | Varma | H02J 3/386 |

OTHER PUBLICATIONS

European Patent Office, Written Opinion of the ISA for PCT/IB2016/055518, dated Nov. 18, 2016, 6 pages.
European Patent Office, International Preliminary Report on Patentability for PCT/IB2016/055518, dated Mar. 20, 2018, 7 pages.

\* cited by examiner

MICRO-GRID HAVING A DIESEL GENERATOR WITH CLUTCH

CROSS-REFERENCE TO RELATED APPLICATIONS

This application is a U.S. national stage of International Application Serial No. PCT/IB2016/055518, filed Sep. 16, 2016, which claims priority to Indian Patent Application No. 5007/CHE/2015, filed Sep. 18, 2015. The entire disclosures of both of the foregoing applications are hereby incorporated by reference.

FIELD OF INVENTION

The present invention relates generally to micro-grids and more specifically to control of operation of a rotating electrical machine in a micro-grid.

BACKGROUND

Micro-grids, are localized grids (or electrical networks) which can operate autonomously of the traditional large scale grids, and are capable of connecting and disconnecting with the traditional grids.

For powering the various loads connected to the micro-grid, there are often a plurality of renewable power generation sources including solar, wind etc., in the micro-grid, which can be used in addition to, or as an alternative to the conventional grid. However, due to the variability of the renewable power generation sources, micro-grids need to be capable of handling fluctuations or variations in electrical power.

To compensate for such variations in electrical power observed in renewable power generation sources, conventionally a diesel generator set or a power storage devices is used to provide additional power in the micro-grid. However, in the case of use of diesel generator set to compensate for power variations considering the ramp-up time of the diesel generator set, the response time of the diesel generator set needs to be managed to provide seamless integration of the diesel generator in the micro-grid and thereby have an effective means to handle power variations in the micro-grid.

Therefore there is a need for improved system and method for monitoring and controlling power variations in micro-grids.

SUMMARY OF THE INVENTION

The above-mentioned shortcomings, disadvantages and problems are addressed herein which will be understood by reading and understanding the following specification.

In one aspect, the present invention discloses a control system for monitoring and control of a micro-grid. The micro-grid comprises one or more power generation sources capable of being connected or disconnected to one or more electrical loads using power equipment and a rotating electrical machine. The rotating electrical machine is electrically connectable to an electrical bus of the micro-grid for supplying electrical power to the electrical bus. A clutch is provided on the shaft of the rotating electrical machine for coupling or decoupling the shaft of the rotating electrical machine to a shaft of a prime mover.

The control system comprises a plurality of controllers for controlling the power generation sources and the electrical loads using the power equipment. The plurality of controllers are communicatively connected amongst themselves using a communication bus. The plurality of controllers includes a first controller for controlling at least one of a power generation source and an electrical load from the power generation sources and the electrical loads, and a second controller for controlling a rotating electrical machine.

The first controller is configured to detect a power variation event and communicate information regarding the power variation event on the communication bus. Based on the communication, the second controller operates the rotating electrical machine by engaging the clutch to couple the rotating electrical machine to a prime mover for one of supplying electrical power to the electrical bus.

In an embodiment, the second controller is configured to control power output of the prime mover based on coordination with the first controller by the communication over the communication bus.

In an embodiment, the at least one of the power generation source and the electrical load, controlled by the first controller, includes an integrated sensing and control unit capable of determining a profile of at least one of the power generation source and the electrical load. The first controller coordinates with the integrated sensing and control unit for determining the power variation event.

In another aspect, the present invention discloses a method for monitoring and control of a micro-grid. The method comprises detecting a power variation event, by the first controller, in the associated at least one of the power generation source and the electrical load, controlled by the first controller, coordinating with the second controller for compensating the power variation event, by the first controller, by communication over the communication bus, and operating the rotating electrical machine by operating the clutch, by the second controller, for coupling the shaft of the rotating electrical machine to the shaft of the prime mover for supplying electrical power to the electrical bus of the micro-grid, based on the communication indicative of the power variation event on the communication bus.

Systems and methods of varying scope are described herein. In addition to the aspects and advantages described in this summary, further aspects and advantages will become apparent by reference to the drawings and with reference to the detailed description that follows.

BRIEF DESCRIPTION OF THE DRAWINGS

The subject matter of the invention will be explained in more detail in the following text with reference to preferred exemplary embodiments which are illustrated in the drawings, in which.

DETAILED DESCRIPTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
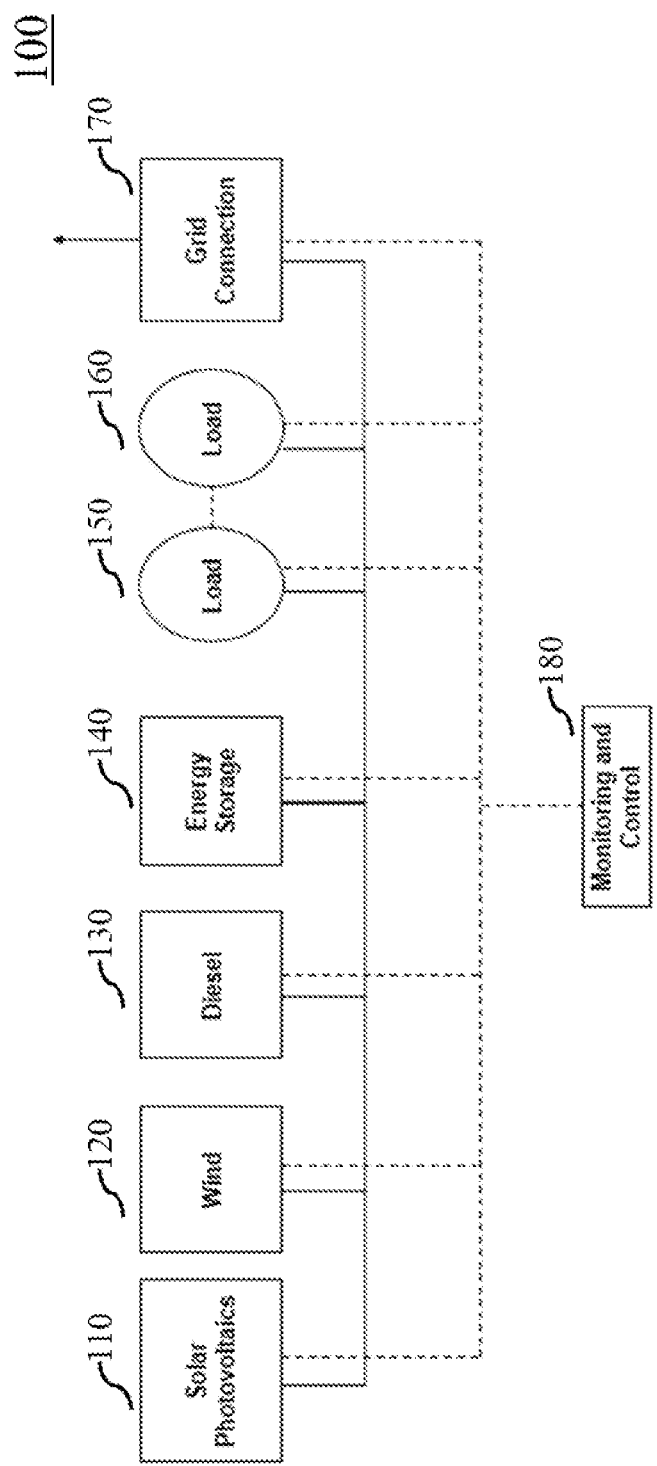
FIG. 1 illustrates the typical components of a micro-grid, in accordance with various embodiments of the present invention.

FIG. 1 illustrates components of a micro-grid 100, in accordance with various embodiments of the present invention. As seen from FIG. 1, the micro-grid 100 includes a plurality of local power generation sources including, a solar or photovoltaic based power generation source 110, wind energy based power generation source 120 and a diesel generator set 130. Additionally, the micro-grid 100 can include an energy storage device 140 for storing surplus power and for providing additional energy in the micro-grid 100 when required. Accordingly, the energy storage device 140 acts as a power generation source when supplying power in the micro-grid 100.

The diesel generator set 130 and the energy storage device 140 are for compensating fluctuations in power generation or power variations due to renewable power generation sources and for handling power shortages. A couple of loads (shown in the FIG. 1 as load 150 and load 160) are connected to the micro-grid 100 and draw power from the micro-grid 100. The components (the power generation sources and the electrical loads) of the micro-grid 100 are connected to the micro-grid 100 using power equipment including circuit breakers, switches, isolators, disconnectors, etc.

The micro-grid 100 is capable of optionally connecting to the conventional large scale grid using known means (illustrated in the figure as grid connection module 170) for receiving power from the conventional large scale grid or for supplying power to the conventional large scale grid.

The operation in the micro-grid 100 are monitored, controlled and managed by a monitoring and control platform 180. The monitoring and control platform 180, also referred to as control platform 180 or control system 180, is responsible for controlling the power equipment for connecting and disconnecting power generation sources and/or loads for power management and for controlling the power generation sources and loads, for example with a diesel generator power source, the control platform is capable of controlling the diesel generator set to provide stipulated power by providing set points to diesel generator, and for optimizing power utilization from the power generation sources and so forth for effective power management.

The control platform 180 includes a plurality of sensing and control devices (not shown in FIG. 1) communicatively interconnected amongst themselves using a communication bus comprised in the control platform, for monitoring and controlling the micro-grid 100. The plurality of sensing and control devices monitor and control the components (or equipment) of the micro-grid 100. A sensing and control device herein is also referred as a controller without explicit reference to the associated sensing or measuring functions. Additionally, the control platform 180 is integrated with stand-alone controllers of power generation sources and/or loads for controlling the corresponding power generation sources and/or loads.

The plurality of controllers coordinate amongst themselves and with other devices (e.g. server, database) of the control platform by communicating over the communication bus, for controlling and managing the operations of the micro-grid 100. The control system 180 including the plurality of controllers, is responsible for power management including handling power variations in the micro-grid 100, by coordinating and regulating operations amongst components of the micro-grid 100.

In an embodiment, the control system 180 can include plurality of devices, well known in the state of the art such as a server (shown in FIG. 2 as server 260) for performing complex computations based on information received from the controllers and a database (shown in FIG. 2 as database 265) having operation related information (history, load profile, source profile etc.) relating to the components of the micro-grid 100. Aspects in relation to the control system 180 are further elaborated in the description of FIG. 2.

Figure 2:
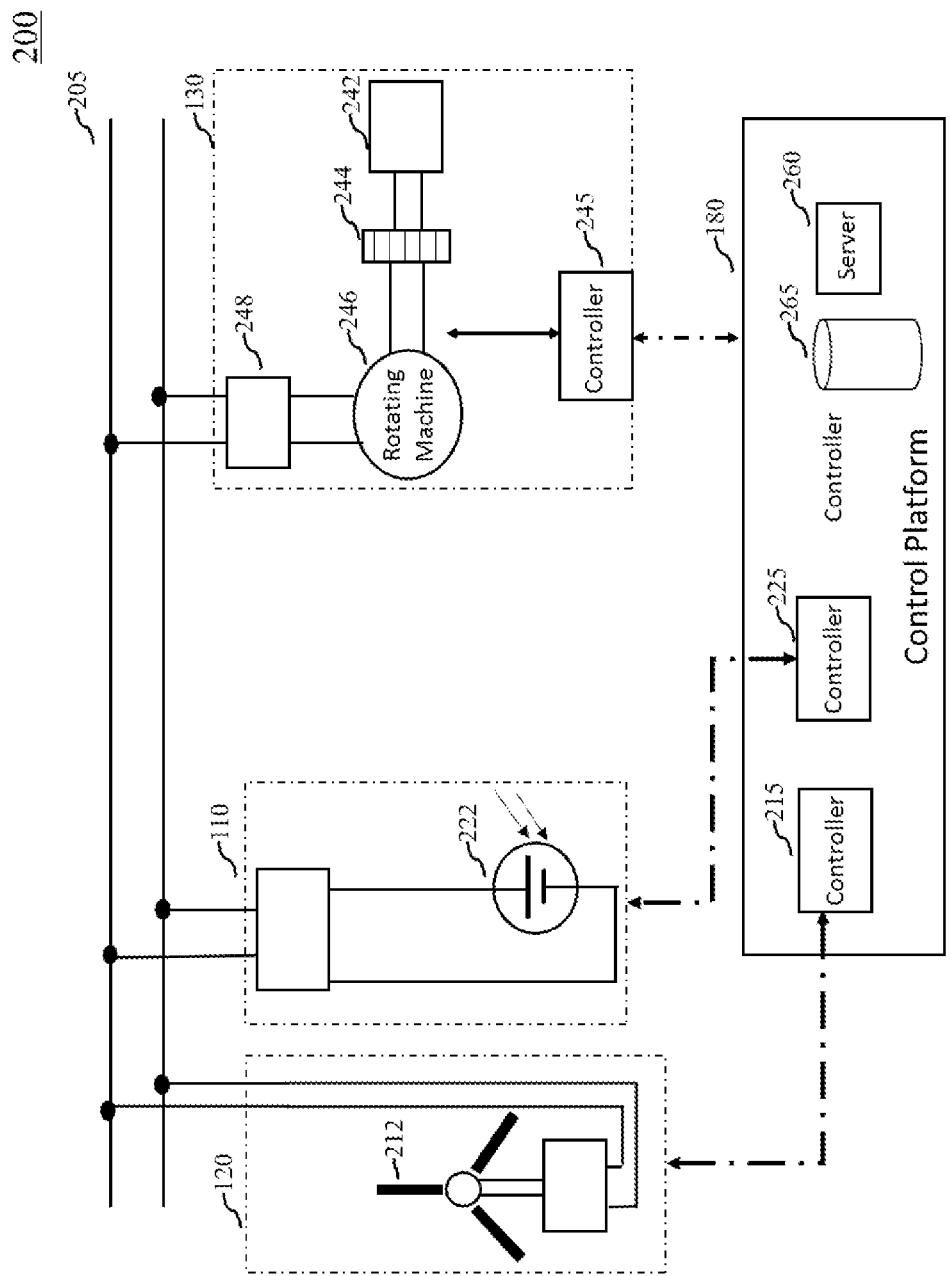
FIG. 2 illustrates a section of a micro-grid having a plurality of power generation sources connected to a bus of the micro-grid, in accordance with various embodiments of the present invention.

FIG. 2 illustrates a section 200 of a micro-grid 100 having an electrical bus 205 of the micro-grid 100, in accordance with various embodiments of the present invention. As seen from the FIG. 2, the solar or photovoltaic power generation source 110 includes one or more photovoltaic panels 222 which are connected to the electrical bus 205 appropriately using a connecting means 214 e.g. power convertors or/and switching devices (circuit breakers), as may be required. A sensing and control device (controller) 215 of the control system 180 is responsible for monitoring the power generated by the solar or photovoltaic power generation source 110 and for controlling the electrical connection between the photovoltaic power generation source 110 and the electrical bus 205 of the micro-grid 100 by operating the connecting means.

Similarly, the wind energy based power generation source 120 includes one or more windmills which are connected to the electrical bus 205 using a connecting means 224 e.g. power convertors or/and switching devices (circuit breakers) as may be required. A controller 225 of the control system 180 is responsible for monitoring the power generated by the wind energy based power generation source 120 and for controlling the electrical connection between the wind energy based power generation source 120 and the electrical bus 205 of the micro-grid 205.

The diesel generator set 130 includes a rotating electrical machine (for e.g. a generator) 246 for generating electrical power and capable of being engaged with a clutch 244 to a prime mover 242 (for e.g. a diesel engine). The rotating electrical machine 246 can be operated to supply power as an electrical generator with arrangements for electrically synchronizing the power in a micro-grid and for managing power demands in the micro-grid 100 in a fast manner. The rotating electrical machine 205 is connectable to the electrical bus 205 of the micro-grid 100 using a connecting means 248 e.g. power convertors or/and switching devices (circuit breakers), as may be required. The control platform includes a controller 245 (also referred to as second controller 245) for controlling the operation of the rotating electrical machine 240, the clutch 244 and the prime mover 242. This is further explained using FIG. 3 and exemplary embodiments provided below.

Figure 3:
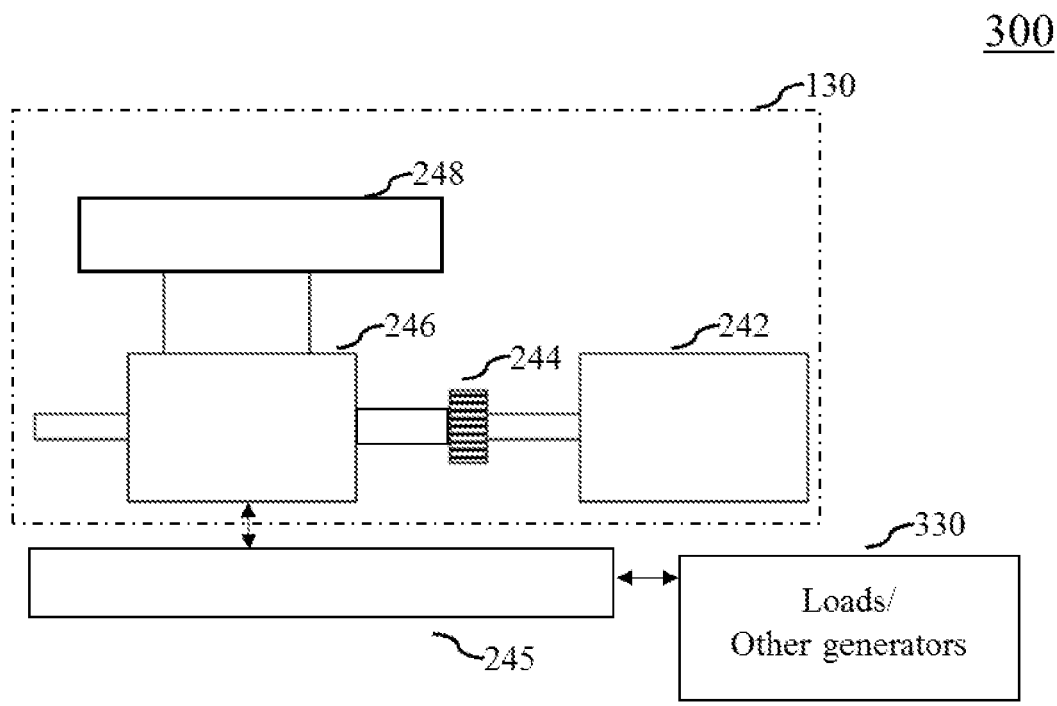
FIG. 3 illustrates a rotating electrical machine with a clutch capable of coupling to a diesel engine, in accordance with various embodiments of the present invention.

FIG. 3 illustrates the rotating electrical machine 246 with the clutch 245 capable of coupling to the prime mover 242, in accordance with various embodiments of the present invention.

The rotating electrical machine 246 can be used as a back-up or auxiliary power generation source and for fast power compensation during a power variation event. When due to any incapability or failure of already engaged local power generation source of micro-grid 100 or due to increased power demand from a load connected to the micro-grid 100, the local power generation sources are unable to supply the required power, the control system 180 coordinates with the controller 245 regarding the power variation event, for operating the rotating electrical machine 246 for supplying power in the micro-grid 100.

In a first example, when there is a variation in power balance due to changes in power generation in relation to a renewable power source (120 or 110), the respective controller (also referred to as first controller, 215 or 225 respectively) of the power generation source associated with the variation, detects the power variation event. Similarly in another example, where there is unanticipated increase in power demand from a load which cannot be met by the local power generation sources, the respective controller (also referred to as first controller) of the load, indicates the power variation (power shortage) event.

Upon detection of a power variation event, the first controller coordinates with the second controller 245 by communicating with the second controller 245 over the communication bus, to indicate occurrence (potential or so) of the power variation event. The first controller communicates regarding power variation event on the communication bus. In an embodiment, the communication by the first controller includes information on additional power needed to compensate for the power variation event.

Upon receiving communication regarding the power variation event, the second controller 245 connects the power generation source with the rotating electrical machine 246 to the micro-grid 100, the prime mover 242 which is kept normally running and ready for engagement is engaged with the clutch 244 to couple the shaft of the rotating electrical machine 246 with the shaft of the prime mover 242 to enable the power generation source to generate the required power accordingly being synchronized to supply power in the micro-grid. Accordingly, the second controller 245 connects the rotating electrical machine 246 to the micro-grid 100 for supplying power in the micro-grid 100 and the controller 245 operates the rotating electrical machine 246 as a generator to provide additional power to compensate for the power variation.

Figure 4:
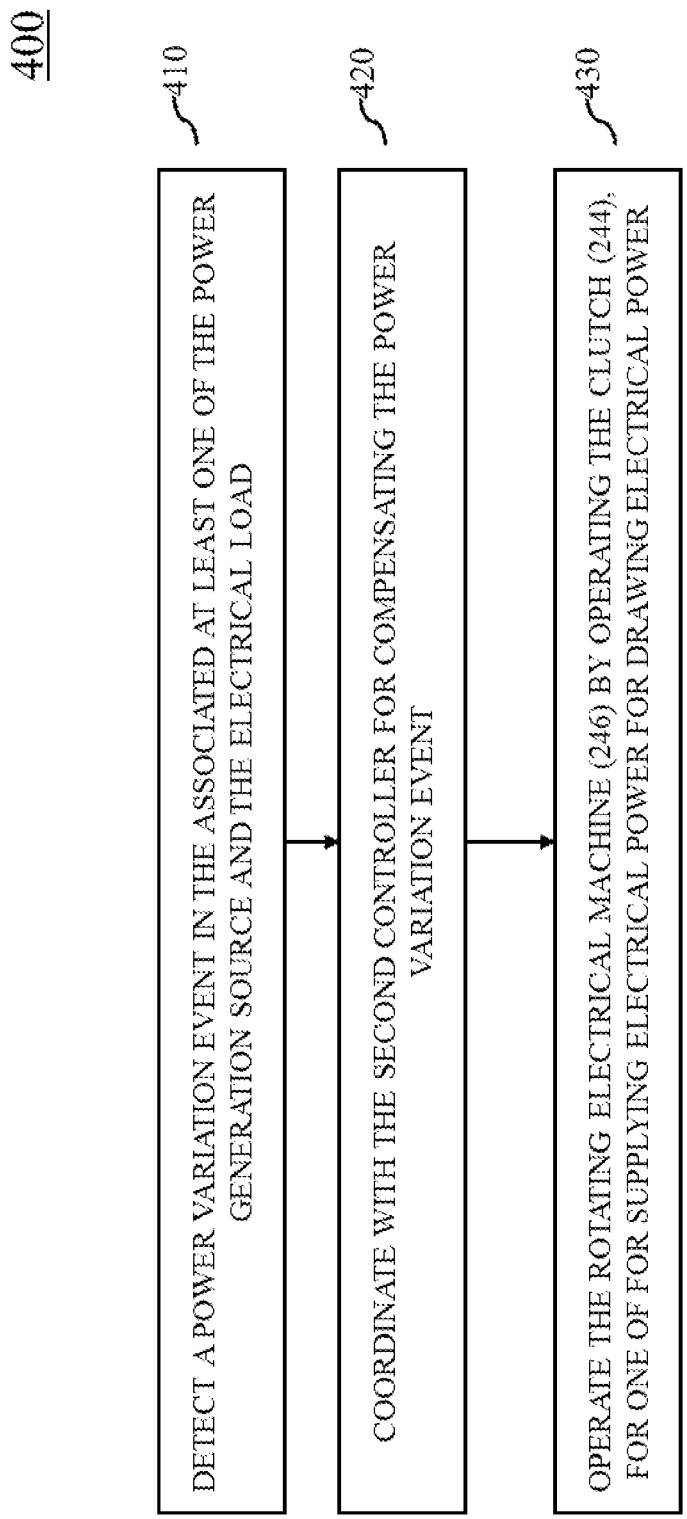
FIG. 4 illustrates a method for monitoring and controlling the micro-grid, in accordance with various embodiments of the present invention.

FIG. 4 illustrates a method 400 for monitoring and controlling the micro-grid 100, in accordance with various embodiments of the present invention. The method comprises the following steps.

At step 410, as previously explained above, the first controller detects the power variation event in the associated at least one of the power generation source and the electrical load, controlled by the first controller.

At step 420, the first controller coordinates with the second controller 245 for compensating the power variation event, by communication over the communication bus.

At step 430 the second controller 245 operates the rotating electrical machine 246, by operating the clutch, for coupling the shaft of the rotating electrical machine 246 to the shaft of the prime mover 242 for supplying electrical power to the electrical bus 205 of the micro-grid 100, based on the communication indicative of the power variation event on the communication bus.

It is to be noted by a person skilled in the art, that the micro-grid 100 may be a direct current (DC) grid or an alternating current (AC) grid. Accordingly, connections between the micro-grid 100, and the power generation sources or the loads includes appropriate convertors well-known in the state of the art. Additionally, it is to be noted by a person skilled in the art, that communication between the components of the control system 180 over the communication bus, can include wired or wireless means, conventionally known in the state of the art.

In an embodiment, prior to communication regarding the power variation event, the second controller 245 keeps the prime mover 242 running at nominal speed while the shaft of the rotating electrical machine 246 and the shaft of the shaft of the prime mover 242 are disengaged. Upon communication regarding the power variation event, the controller 245 connects the shaft of rotating electrical machine 246 to the shaft of the prime mover 242 by engaging the clutch 244.

In another embodiment, prior to communication regarding the power variation event, the second controller 245 keeps the rotating electrical machine 246 ramped up using one or more rotational mechanical means known in the state of art. For example, the second controller 245 runs the rotating electrical machine 246 as a motor by drawing power from the electrical bus of the micro-grid. Upon communication regarding the power variation event, the controller 245 connects the shaft of rotating electrical machine 246 to the shaft of the prime mover 242 by engaging the clutch 244, and runs the rotating electrical machine run as a generator.

In an embodiment, the first controller is connected to a plurality of sensors measuring non-electrical parameters of the power generation source indicative of the power generated by the power generation source. For example, when the power generation source is the solar power generation source 130, the first controller monitors a sunlight related parameter for example luminosity or temperature of the solar panel 222 and accordingly, detects a power variation event (including a potential occurrence) when the sunlight related parameter associated with the solar panel 222 is below a threshold value. Similarly, when the power generation source is the wind energy based power generation source 120, the first controller monitors the rotation speed of the wind mill 212 and accordingly, detects a power variation event (including a potential occurrence) when the rotation speed of the wind mill 212 is below a threshold value.

In an exemplary embodiment, the load controlled by the first controller, includes an integrated sensing and control unit. The integrated sensing and control unit is capable of communicating with the first controller over the communication bus or via a dedicated communication channel. Additionally, the sensing and control unit when associated with a load is capable of utilizing a load profile of the associated load based on historic information and usage pattern associated with the load. Based on the load profile of the associated load, the sensing and control unit coordinates with the first controller for detecting a potential power variation event. In an embodiment, the load profile includes information regarding the sequence of operation of devices connected or coupled to the corresponding load along with associated power consumption information. Thus, there are several means for a sensing and control unit to detect a potential load variation event.

In an embodiment, the second controller 245 is configured to control the prime mover 242 based on the power variation information, for generating sufficient power to compensate the power variation.

In an embodiment, the controller 245 is responsible for ensuring mechanical synchronization between the rotating electrical machine 246 and the prime mover 242 prior to engaging the clutch 244 for coupling the shaft of the rotating electrical machine 246 and the prime mover 242.

In an example, when the rotating electrical machine 246 is run as a motor, the controller 245 operates the prime mover to keep the prime mover 242 running constantly at a no load state and at low speed. Upon receiving communication regarding the power variation event, the controller 245 ramps up the prime mover 242 to a rotational speed equivalent to the rotational speed at which the rotating electrical machine 246 is kept running. The controller 245 monitors the speed of the prime mover 242 using well known techniques. Accordingly, the controller 245 engages the clutch 244 when the rotational speed of the prime mover 242 and the rotational speed of the rotating electrical machine 246 are matched.

Similarly, in an embodiment, the controller 245 is responsible for ensuring electrical synchronization between the rotating electrical machine 246 and the micro-grid 100 prior to connecting the rotating electrical machine to the micro-grid 100 while the rotating electrical machine 246 is being run as a generator, using a plurality of well-known techniques.

In an embodiment, a fly wheel (not shown in figures) is along provided on the shaft of the rotating electrical machine 246 for storing kinetic energy to drive the rotating electrical machine 246 while the shaft of the rotating electrical machine 246 is being engaged/disengaged with the shaft of the prime mover 242. This allows for easy and energy efficient coupling with hardly any drop in speed or effect in synchronization.

In another embodiment the rotating electrical machine 245 can be a dc (direct current) generator/motor, or any other type of rotating machine whose operation is reversible from that of a motor to that of a generator. In an embodiment, the prime mover 242 is a diesel engine. In another embodiment the prime mover 242 is a gas turbine.

In an embodiment, the server 260 of the control system 180 additionally receives the communication over the communication bus. Then, the server 260 coordinates with the controllers (215, 225) associated with the remaining power generation sources to determine if additional power from the rotating electrical machine 246 is required. Accordingly, based on the determination, the server 260 further coordinates with the second controller 245 for operating the rotating electrical machine 246.

It is to be noted that the current invention discloses a system and method for handling power variation events. By providing a rotating electrical machine capable of quickly ramping up as a generator, the current invention enables quick handling of power variation events. Moreover, as disclosed in the current invention, upon detection of the power variation event, the first controller is capable to communicate with the second controller for compensating the power variation event. Through this direct inter controller communication, processing and communication latency related with intermediary servers is avoided allowing for faster handling of the power variation event.

Additionally, the present invention discloses a rotating electrical machine which can be kept running as a rotating electrical motor when decoupled with the engine and as an electrical generator when engaged with the engine, thereby enabling seamless and fast transition between connection and disconnection of the rotating electrical machine with and from the micro-grid. The control system via the second controller can operate the clutch for running the rotating electrical machine for providing power to one or more sections of the micro-grid in a fast acting manner.

While only certain features of the invention have been illustrated and described herein, many modifications and changes will occur to those skilled in the art. It is, therefore, to be understood that the appended claims are intended to cover all such modifications and changes as fall within the true spirit of the invention

I claim:

1. A control system for monitoring and control of a micro-grid, the micro-grid comprising a plurality of power generating sources capable of being connected and disconnected from a plurality of electrical loads in the micro-grid and a rotating electrical machine electrically connectable to an electrical bus of the micro-grid as one of a power generating source and an electrical load, the control system comprising:
a plurality of controllers for controlling the plurality of power generation sources and the plurality of loads, wherein the plurality of controllers are communicatively connected to each other over a communication bus, the plurality of controllers comprising:
a first controller for controlling at least one of a power generation source and an electrical load, from the plurality of power generation sources and from the plurality of electrical loads respectively; and
a second controller for controlling the rotating electrical machine, wherein the second controller operates a clutch for at least one of coupling and decoupling a shaft of the rotating electrical machine to a shaft of a prime mover and ensures electrical synchronization between the rotating electrical machine and the micro-grid prior to connecting the rotating electrical machine to the electrical bus of the micro-grid;
wherein the first controller is configured to detect a power variation event in the associated at least one of the power generation source and the electrical load, controlled by the first controller; and
wherein the second controller is configured to operate the rotating electrical machine by operating the clutch for at least one of (i) coupling the shaft of the rotating electrical machine to the shaft of the prime mover for supplying electrical power to the electrical bus of the micro-grid and (ii) de-coupling the shaft of the rotating electrical machine from the shaft of the prime mover, based on a communication indicative of the power variation event on the communication bus.

2. The control system as claimed in claim 1, wherein the first controller is configured to communicate with the second controller over the communication bus upon detecting the power variation event.

3. The control system as claimed in claim 1, wherein the first controller coordinates with the second controller on additional power to be supplied by the rotating electrical machine to compensate for the power variation event, by the communication over the communication bus.

4. The control system as claimed in the claim 1, wherein the second controller is configured to control power output of the prime mover based on coordination with the first controller, by the communication over the communication bus.

5. The control system as claimed in claim 1, wherein the at least one of the power generation source and the electrical load controlled by the first controller includes an integrated sensing and control unit capable of determining a profile of the at least one of the power generation source and the electrical load, and wherein the first controller coordinates with the integrated sensing and control unit for determining the power variation event.

6. The control system as claimed in claim 1, further comprising a server communicatively connected to the plurality of controllers over the communication bus to coordinate operation of the plurality of controllers.

7. The control system as claimed in claim 1, wherein the first controller is configured to directly communicate with the second controller over the communication bus for compensating the power variation event to avoid processing and communication latency associated with use of one or more intermediary servers.

8. The control system as claimed in claim 1, wherein the first controller controls the electrical load and is configured to detect the power variation event when there is an unanticipated increase in a power demand from the electrical load that cannot be met by a local power generation source.

9. A method for monitoring and control of a micro-grid having one or more power generating sources capable of being connected and disconnected from one or more electrical loads in the micro-grid and a rotating electrical machine electrically connectable to an electrical bus of the micro-grid as one of a power generating source and an electrical load, using a control system having a first controller controlling at least one of a power generation source and an electrical load, from the one or more power generation sources and from the one or more electrical loads respectively, and a second controller controlling the rotating electrical machine, the first controller and second controller communicatively coupled over a communication bus, the method comprising:

detecting a power variation event, by the first controller, in the associated at least one of the power generation source and the electrical load controlled by the first controller;

coordinating the first controller with the second controller for compensating the power variation event, by communication over the communication bus;

electrically synchronizing, by the second controller, the rotating electrical machine and the micro-grid prior to connecting the rotating electrical machine to the electrical bus of the micro-grid; and operating the rotating electrical machine by operating a clutch, by the second controller, for at least one of (i) coupling a shaft of the rotating electrical machine to a shaft of a prime mover for supplying electrical power to the electrical bus of the micro-grid and (ii) decoupling the shaft of the rotating electrical machine from the shaft of the prime mover, based on communication indicative of the power variation event on the communication bus.

* * * * *